(12) United States Patent
Shchemelinin et al.

(10) Patent No.: US 9,709,811 B2
(45) Date of Patent: Jul. 18, 2017

(54) SYSTEM AND METHOD FOR SEPARATION OF PUMP LIGHT AND COLLECTED LIGHT IN A LASER PUMPED LIGHT SOURCE

(71) Applicant: KLA-Tencor Corporation, Milpitas, CA (US)

(72) Inventors: Anatoly Shchemelinin, Pleasanton, CA (US); Ilya Bezel, Sunnyvale, CA (US); Matthew Panzer, San Jose, CA (US); Eugene Shifrin, Sunnyvale, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 0 days.

(21) Appl. No.: 14/459,095

(22) Filed: Aug. 13, 2014

(65) Prior Publication Data

US 2015/0049778 A1 Feb. 19, 2015

Related U.S. Application Data

(60) Provisional application No. 61/865,981, filed on Aug. 14, 2013.

(51) Int. Cl.
*G02B 27/10* (2006.01)
(52) U.S. Cl.
CPC ................. *G02B 27/1006* (2013.01)
(58) Field of Classification Search
USPC ............................. 250/503.1, 504 R; 372/76
See application file for complete search history.

(56) References Cited

U.S. PATENT DOCUMENTS

| 3,711,791 | A * | 1/1973 | Erickson | H01S 3/11 359/328 |
| 4,461,005 | A * | 7/1984 | Ward | H01S 3/117 372/10 |
| 6,287,765 | B1 * | 9/2001 | Cubicciotti | C07H 21/00 435/6.1 |
| 7,433,568 | B2 * | 10/2008 | Tanaka | G03F 7/70075 385/133 |
| 7,435,982 | B2 | 10/2008 | Smith | |
| 7,705,331 | B1 | 4/2010 | Kirk et al. | |
| 7,786,455 | B2 | 8/2010 | Smith | |

(Continued)

OTHER PUBLICATIONS

U.S. Appl. No. 14/231,196, Mar. 31, 2014, Ilya Bezel et al.

(Continued)

*Primary Examiner* — Phillip A Johnston
(74) *Attorney, Agent, or Firm* — Suiter Swantz pc llo (57) ABSTRACT

A system for separating plasma pumping light and collected broadband light includes a pump source configured to generate pumping illumination including at least a first wavelength, a gas containment element for containing a volume of gas, a collector configured to focus the pumping illumination from the pumping source into the volume of gas to generate a plasma within the volume of gas, wherein the plasma emits broadband radiation including at least a second wavelength and an illumination separation prism element positioned between a reflective surface of the collector and the pump source and arranged to spatially separate the pumping illumination including the first wavelength and the emitted broadband radiation including at least a second wavelength emitted from the plasma.

49 Claims, 7 Drawing Sheets

(56) References Cited

U.S. PATENT DOCUMENTS

| | | | |
|---|---|---|---|
| 8,525,138 B2 * | 9/2013 | Smith | B82Y 10/00 250/503.1 |
| 9,558,858 B2 | 1/2017 | Shortt et al. | |
| 2003/0012246 A1 * | 1/2003 | Klimek | H01S 5/18 372/70 |
| 2003/0184854 A1 | 10/2003 | Kamimura et al. | |
| 2007/0228288 A1 | 10/2007 | Smith | |
| 2007/0228300 A1 | 10/2007 | Smith | |
| 2007/0272299 A1 | 11/2007 | Schuss et al. | |
| 2009/0323192 A1 | 12/2009 | Towndrow et al. | |
| 2013/0094077 A1 | 4/2013 | Brueck et al. | |
| 2013/0106275 A1 | 5/2013 | Chimmalgi et al. | |
| 2013/0169140 A1 | 7/2013 | Ko et al. | |
| 2013/0181595 A1 | 7/2013 | Bezel et al. | |
| 2014/0291546 A1 | 10/2014 | Bezel et al. | |
| 2015/0034838 A1 | 2/2015 | Bezel et al. | |
| 2015/0048741 A1 | 2/2015 | Shortt et al. | |

OTHER PUBLICATIONS

U.S. Appl. No. 12/787,827, May 26, 2010, Ilya Bezel.
A. Schreiber et al., Radiation resistance of quartz glass for VUV discharge lamps, Journal of Physics D: Applied Physics, Aug. 19, 2005, p. 3242-3250, vol. 38,IOP Publishing Ltd, Printed in the UK.
U.S. Appl. No. 12/787,827, May 26, 2010, Ilya Bezel et al.

* cited by examiner

SYSTEM AND METHOD FOR SEPARATION OF PUMP LIGHT AND COLLECTED LIGHT IN A LASER PUMPED LIGHT SOURCE

PRIORITY

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a regular (non-provisional) patent application of United States Provisional Patent Application entitled METHODS OF SEPARATION OF PUMP IR AND COLLECTED UV LIGHT FOR LASER PUMPED LIGHT SOURCES, naming Anatoly Shchemelinin, Ilya Bezel, Matthew Panzer and Eugene Shifrin as inventors, filed Aug. 14, 2013, Application Ser. No. 61/865,981. The above application is incorporated herein by reference in the entirety.

BACKGROUND

As the demand for integrated circuits having ever-small device features continues to increase, the need for improved illumination sources used for inspection of these ever-shrinking devices continues to grow. One such illumination source includes a laser-sustained plasma source. Previously, laser sustained plasma light sources have long been configured to decouple infrared (IR) and ultraviolet (UV) light using a cold mirror. Such a cold mirror is formed from a dielectric material designed to transmit selected wavelengths, while reflecting other wavelengths. For example, a cold mirror can be configured to reflect light from the laser pumping source and transmit collected light emitted by the plasma. Although the manufacturing of such a broadband dielectric mirror is challenging, it continues to be the method of choice for visible and near-UV light spectral ranges. Currently available materials make it impossible to achieve a design of an efficient dielectric broadband mirror at spectral regimes below 200 nm. For instance, broadband mirrors in the vacuum ultraviolet (VUV) range (i.e., wavelength below 190 nm) are typically formed from a metal, such as aluminum, and are not transparent typical pump laser wavelengths. Therefore, it is desirable to provide a system and method that avoids the complicated cold mirror coatings and cures the deficiencies described above.

SUMMARY

A system for separating pump light and collected light in a laser pumped light source is disclosed, in accordance with an illustrative embodiment of the present invention. In one illustrative embodiment, the system may include a pump source configured to generate pumping illumination including at least a first wavelength; a gas containment element for containing a volume of gas; a collector configured to focus the pumping illumination from the pumping source into the volume of gas to generate a plasma within the volume of gas, wherein the plasma emits broadband radiation including at least a second wavelength; and one or more illumination separation prism elements positioned between a reflective surface of the collector and the pump source and arranged to spatially separate the pumping illumination including the first wavelength and the emitted broadband radiation including at least a second wavelength emitted from the plasma.

In another illustrative embodiment, the system may include a pump source configured to generate pumping illumination including at least a first wavelength; a gas containment element for containing a volume of gas; a collector configured to focus the pumping illumination from the pumping source into the volume of gas to generate a plasma within the volume of gas, wherein the plasma emits broadband radiation including at least a second wavelength; and a homogenizing element; and an optical fiber optically coupling the pump source and the homogenizing element, wherein the optical fiber is configured to deliver pumping illumination to the homogenizing element at an off-axis location of the homogenizing element.

In another illustrative embodiment, the system may include a pump source configured to generate pumping illumination including at least a first wavelength; a first collector configured to collect and focus the pumping illumination from the pumping source into the volume of gas to generate a plasma within the volume of gas, wherein the plasma emits broadband radiation including at least a second wavelength; a second collector configured to collect and focus broadband radiation emitted by the plasma, the second collector positioned opposite of the first collector; and one or more windows transparent to the at least a first wavelength and positioned between the pump source and a concave collecting portion of the first collector, the first collector, the second collector and the one or more mirrors forming a gas containment chamber.

In another illustrative embodiment, the system may include a pump source configured to generate pumping illumination including at least a first wavelength; a gas containment element for containing a volume of gas; a first collector configured to collect and focus the pumping illumination from the pumping source into the volume of gas to generate a plasma within the volume of gas, wherein the plasma emits broadband radiation including at least a second wavelength; and a second collector configured to collect and focus broadband radiation emitted by the plasma, the second collector positioned opposite of the first collector.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

Reference will now be made in detail to the subject matter disclosed, which is illustrated in the accompanying drawings.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

Referring generally to FIGS. 1A through 3, a system and method for separating pump light and collected light in a laser pumped light source are described in accordance with the present disclosure. Embodiments of the present disclosure are directed to the separation of plasma pumping illumination, such as infrared light, from the collected broadband radiation output, such as VUV radiation, from the plasma. In addition, embodiments of the present disclosure provide such separation without the need of a cold mirror, as will be illustrated in the following description.

FIGS. 1A-1E illustrate a system 100 for separating pump light and collected light in a laser pumped light source, in accordance with an embodiment of the present invention. The generation of plasma within inert gas species is generally described in U.S. patent application Ser. No. 11/695,348, filed on Apr. 2, 2007; U.S. patent application Ser. No. 11/395,523, filed on Mar. 31, 2006; and U.S. patent application Ser. No. 13/647,680, filed on Oct. 9, 2012, which are incorporated herein in their entirety. The generation of plasma is also generally described in U.S. patent application Ser. No. 14/224,945, filed on Mar. 25, 2014, which is incorporated by reference herein in the entirety. Further, the use of a flanged plasma cell is described in U.S. patent application Ser. No. 14/231,196, filed on Mar. 31, 2014; and U.S. patent application Ser. No. 14/288,092, filed on May 27, 2014, which are each incorporated herein by reference in the entirety. In a general sense, the system 100 should be interpreted to extend to any plasma based light source known in the art.

Figure 1A:
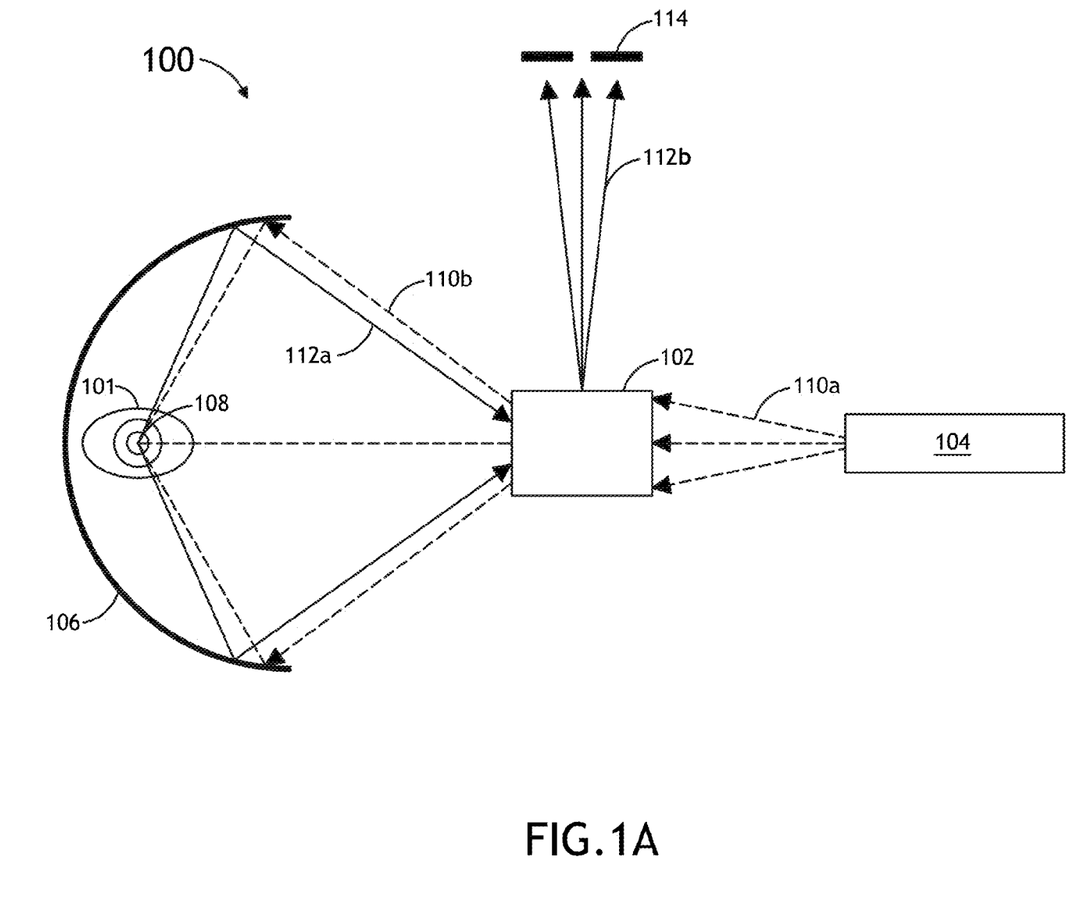
FIG. 1A illustrates a conceptual view of a system for separating pump light and collected light in a laser pumped light source, in accordance with the present invention.

In one embodiment, the system 100 includes pump source 104 (e.g., one or more lasers) configured to generate pumping illumination including at least a first wavelength, or wavelength range, such as, but not limited to, infrared radiation. In addition, the pumping source 104 may generate visible or ultraviolet pumping illumination. In another embodiment, the system 100 includes a gas containment element 101 (e.g., plasma cell, plasma bulb or gas chamber) for containing a volume of gas suitable for generating, or maintaining, a plasma 108.

In another embodiment, the system 100 includes a collector/reflector 106 configured to focus pumping illumination emanating from the pump source 104 into the volume of gas contained within the gas containment element 101. In another embodiment, the collector 106 is arranged to collect broadband illumination 112a (e.g., VUV radiation, DUV radiation, UV radiation and/or visible radiation) emitted by plasma 101 and direct the broadband illumination to one or more additional optical elements (e.g., collecting aperture 114, filter, homogenizer and the like). For example, the collector 106 may collect at least one of VUV broadband radiation, DUV radiation, UV radiation or visible radiation emitted by plasma 101 and direct the broadband illumination 112a to one or more downstream optical elements. In this regard, the gas containment element 101 may deliver VUV radiation, UV radiation and/or visible radiation to downstream optical elements of any optical characterization system known in the art, such as, but not limited to, an inspection tool or a metrology tool. It is noted herein the gas containment element 101 of system 100 may emit useful radiation in a variety of spectral ranges including, but not limited to, DUV radiation, VUV radiation, UV radiation, and visible radiation.

In one embodiment, the system 100 includes one or more illumination separation prism elements 102. In one embodiment, the one or more prism-based illumination separation elements (e.g., one or more prisms) are positioned between a reflective surface of the collector 106 and the pump source 104. In another embodiment, the one or more prism-based illumination separation elements 102 are arranged (e.g., positioned and oriented) to spatially separate the pumping illumination 110a, 110b from the pumping source 104 and the broadband radiation emitted 112a, 112b by the plasma 108. For example, the illumination from the pump source 104 may include light of a first wavelength, or wavelength range, such as IR light, while the emitted broadband radiation from the plasma 108 includes light of a second wavelength, or wavelength range, such VUV light. In this regard, the prism-based element 102 may be selected to be transparent to both the first wavelength of light associated with the pump source 104 and the second wavelength of light associated with the emitted broadband radiation from the plasma 108.

It is noted herein that the prism-based illumination separation elements may be formed from any material or materials known in the art transparent to both the pumping light 112a, 112b and the emitted radiation 110a, 110a from the plasma 108. For example, in the case of an IR-based pumping laser and plasma emitting VUV radiation, the prism-based optical element 102 may be formed from a material such as, but not limited to, $CaF_2$ or $MgF_2$, sapphire or crystalline quartz. It is recognized herein that such materials provide for the use of refractive optical elements at wavelengths below 200 nm (e.g., VUV light). In the case of a prism element 102 formed from $CaF_2$, the index of refraction of $CaF_2$ is 1.429 at 1 μm (suitable for use as pumping radiation) and exceeds 1.49 at or below 200 nm. In the case of a prism element 102 formed from $MgF_2$, the index of refraction of MgF2 is 1.37 at 1 μm and exceeds 1.42 at or below 200 nm. It is noted herein that the prism-based illumination separation elements are arranged within system 100 so as to separate light from the pumping source 104 and the light emitted by the plasma 108 using the dispersion relationship noted above.

It is noted herein that the construction of the one or more illumination separation prism elements 102 of system 100 are not limited to the materials listed previously herein and such materials have been provided merely for illustrative purposes. It is further recognized herein that the choice of material used to construct the separation prism element 102 may depend on the required level of refractive index variation between the pumping illumination (e.g., IR light) and the plasma-generated illumination (e.g., VUV light) and/or the required level of transmission of the plasma-generated illumination for a given application.

Further, while the one or more prism elements 102 are discussed throughout the present disclosure in the context of an IR-based pump source 104 and VUV light emitted by plasma 108, the present invention is not limited to such wavelengths or wavelength ranges. It is recognized herein that the system 100 may be extended to a pump source 104 capable of emitting any suitable wavelength, or range of wavelengths, of light, such as, but not limited to, IR light, visible light and UV light. Further, the system 100 may be extended to plasma-emitted radiation of any suitable wavelength, or wavelength range, including, but not limited to, visible, NUV, UV, DUV, VUV and EUV light.

Figure 1B:
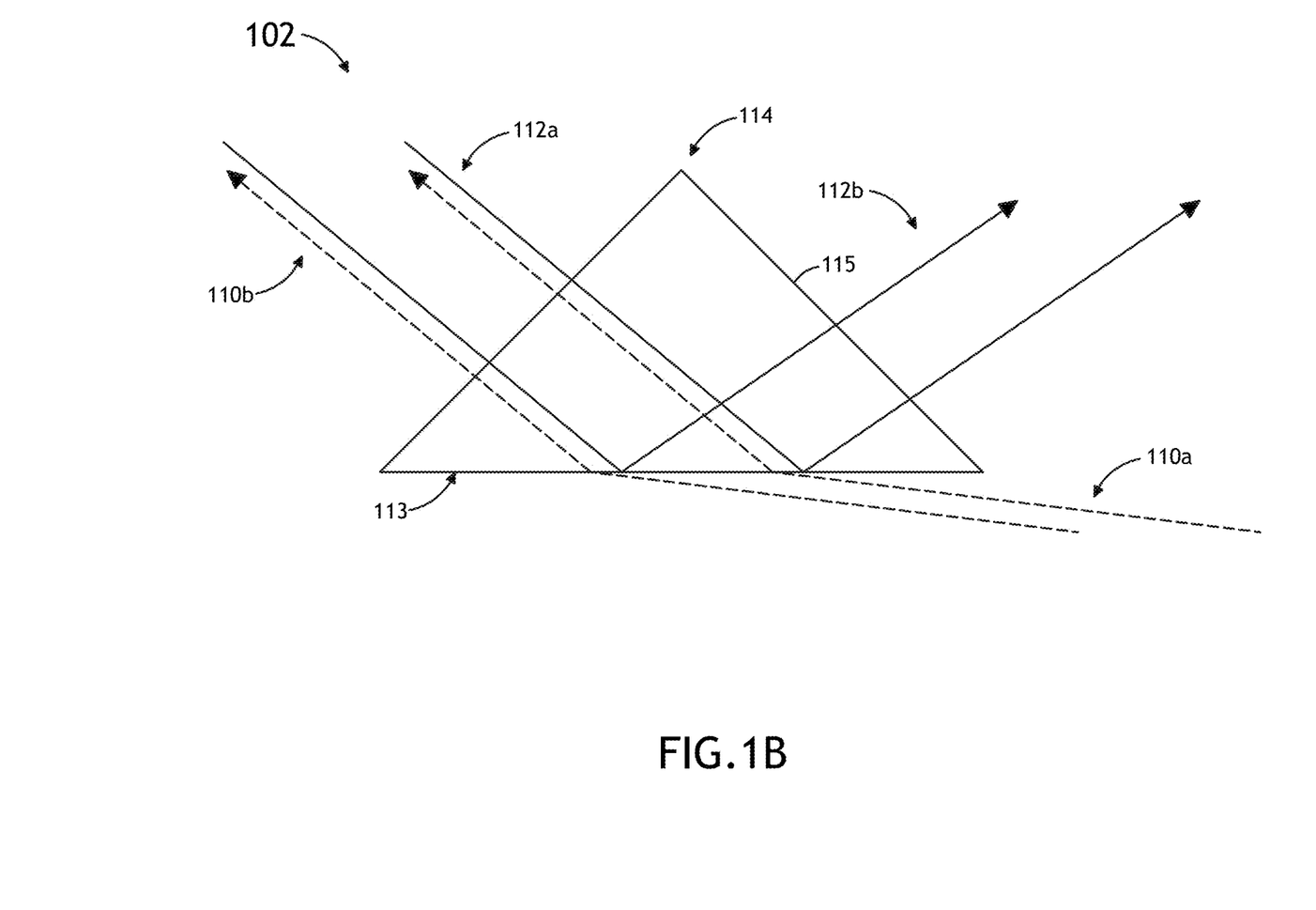
FIG. 1B illustrates a conceptual view of a total internal reflection separation element, in accordance with the present invention.

Referring to FIG. 1B, in one embodiment, the one or more separation prism elements 102 include a total internal reflection element 114. In one embodiment, the total internal reflection (TIR) element 114 is positioned between a reflective surface of the collector 106 and the pump source 104. In another embodiment, the TIR element 114 is arranged so as to spatially separate the pumping illumination 110a including the first wavelength and the emitted broadband radiation 112b including at least a second wavelength emitted from the plasma. For example, as shown in FIG. 1B, pumping illumination 110a of a first wavelength (e.g., IR) incident on the TIR element 114 may be spatially separated from plasma-generated radiation 112b (e.g., VUV light) exiting the TIR element 114.

In one embodiment, the TIR element is formed from a selected material (e.g., $CaF_2$, $MgF_2$ and the like) and arranged relative to the pump source 104 and the generated plasma 108 in order to establish total internal reflection of the plasma illumination 112a incident on the TIR element. Further, the TIR element is formed from a material that is transparent to the pump illumination 110a from the pump source 104. For example, as shown in FIG. 1B, the material, position and orientation of the TIR element 114 may be selected such that the plasma illumination 112a, 112b undergoes total internal reflection at a first surface 113 within the TIR element 114 and exits the TIR element 114 at a second surface 115. The exiting plasma illumination 112b may then be directed to downstream optical element (e.g., UV collecting aperture), as discussed further herein. Further, the material, position and the orientation of the TIR element 114 may be selected such that the pumping illumination 110a is refracted at the first surface 113 and is transmitted through the TIR element. Then, the pumping illumination 110b exits the TIR element 114 at a third surface 117 toward the gas containment element 101 for plasma generation. In this regard, the refractive index difference between the first wavelength of light associated with the pumping source 104 and the second wavelength of light associated with the output of the plasma 108, allows for the manufacturing of a TIR element 104 that is transparent to light of the first wavelength (e.g., IR light) and totally internally reflective to light of the second wavelength (e.g., VUV light).

It is noted herein that the construction of the TIR element 114 is not limited to the materials listed previously herein and such materials have been provided merely for illustrative purposes. It is further recognized herein that the choice of material used to construct the TIR element 114 may depend on the required level of refractive index variation between the pumping illumination (e.g., IR light) and the plasma-generated illumination (e.g., VUV light) and/or the required level of transmission of the plasma-generated illumination for a given application.

In another embodiment, although not shown, the TIR element 114 may include an IR coating or an anti-reflective (AR) coating disposed on one or more of the surfaces of the TIR element 114 in order to reduce reflectivity of the one or more surfaces of the TIR element 114.

Figure 1C:
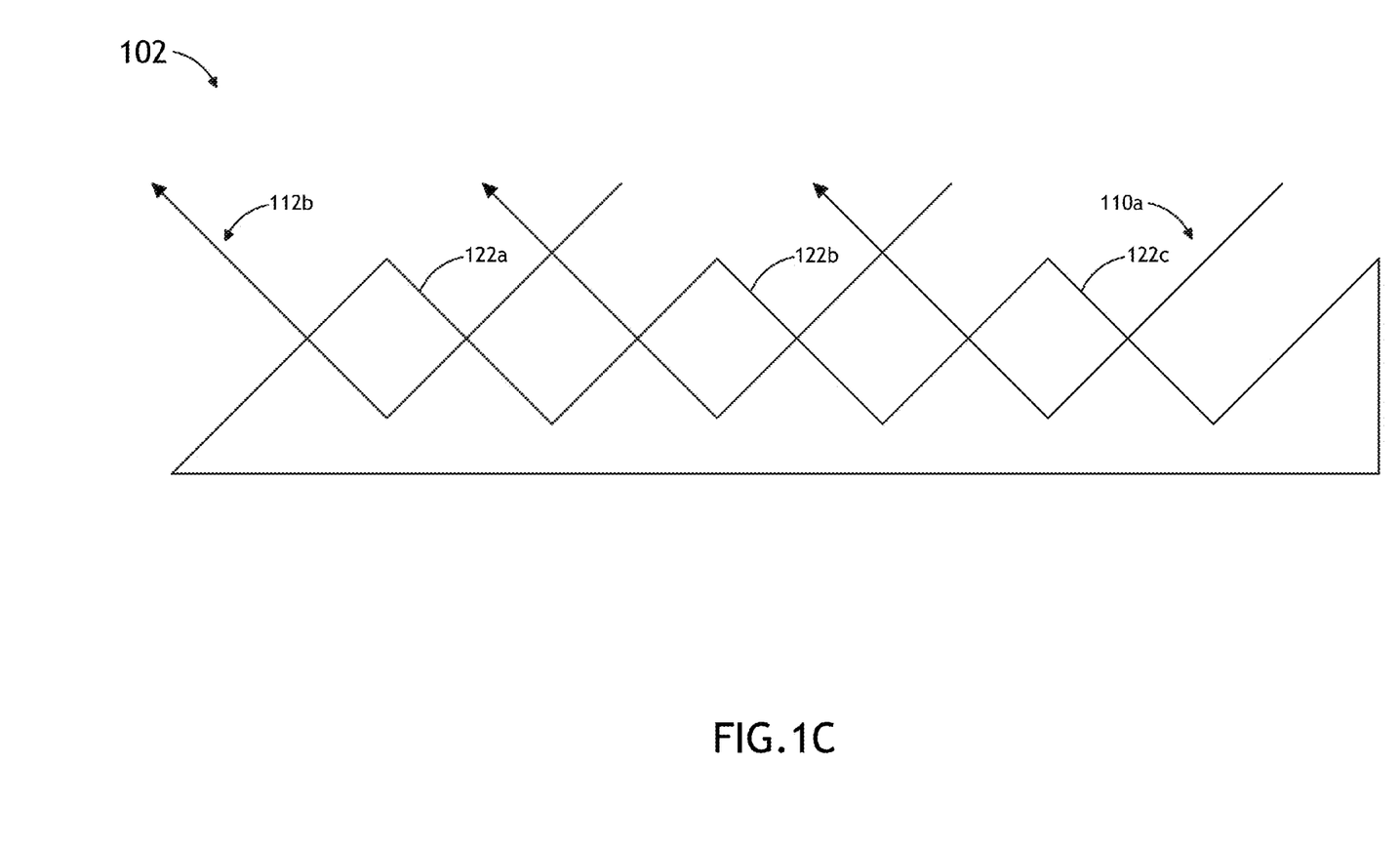
FIG. 1C illustrates a conceptual view of a plurality of total internal reflection separation elements forming a prism array, in accordance with the present invention.

Referring to FIG. 1C, in another embodiment, the TIR element 114 may include a plurality of prism structures 122a-122c. In this regard, the prism structures 122a-122c may form a 'prism array.' It is noted herein that such a structure may be utilized in order to reduce bulk absorption of the plasma-generated light 112b (e.g., VUV light) in the TIR element 114. It is further contemplated herein that the prism array formed with prism structures 122a-122c may be utilized in lithographic settings, allowing for a system 100 implementing such a prism array to structured illumination to a lithographic target.

Figure 1D:
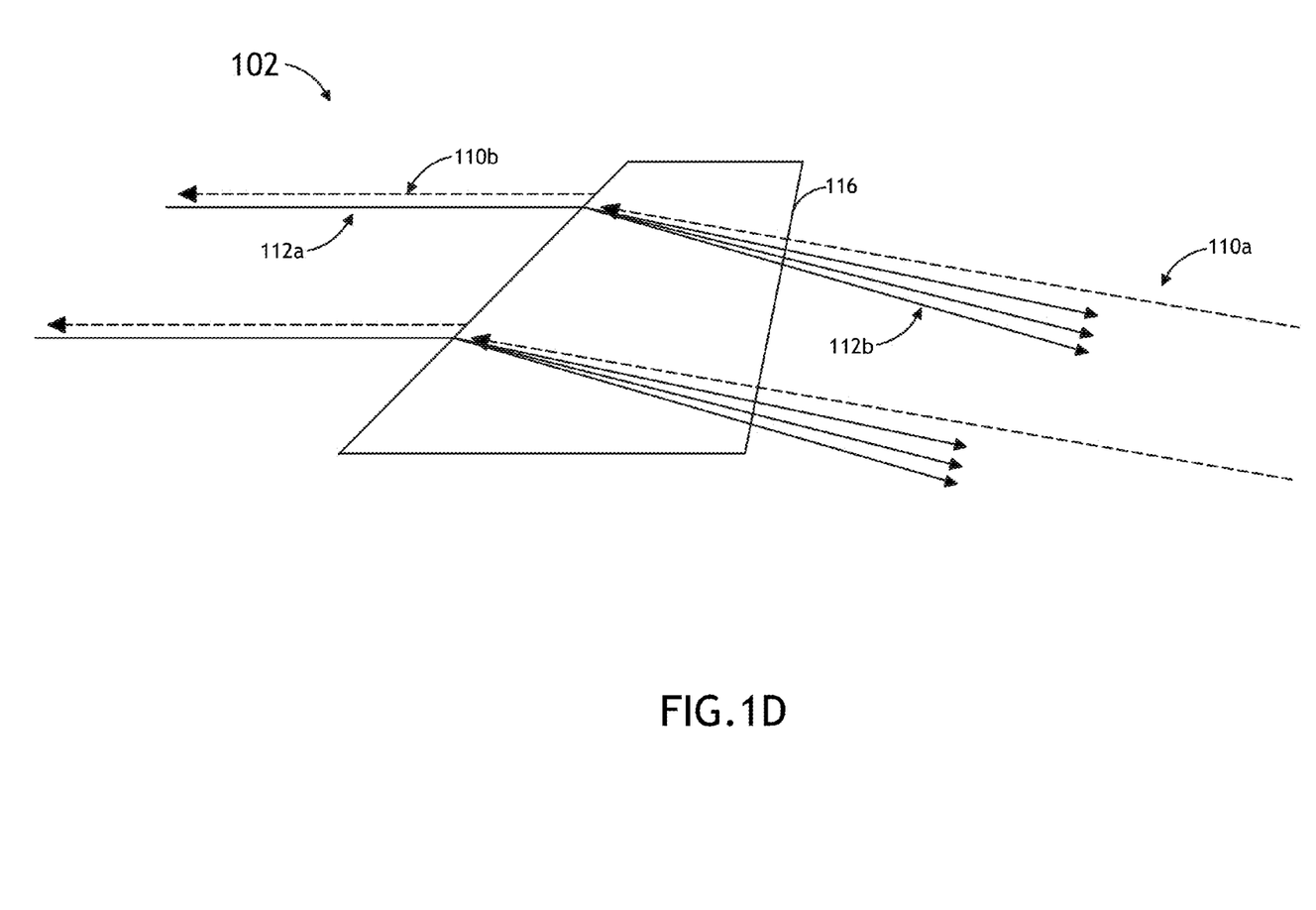
FIG. 1D illustrates a conceptual view of a dispersion separation element, in accordance with the present invention.

Referring to FIG. 1D, in one embodiment, the one or more separation prism elements 102 include a dispersion element 116. In one embodiment, the dispersion element 116 is positioned between a reflective surface of the collector 106 and the pump source 104. In another embodiment, the dispersion element 116 is arranged so as to spatially separate the incident pumping illumination 110a including the first wavelength and the emitted broadband radiation 112b including at least a second wavelength emitted from the plasma. For example, as shown in FIG. 1D, the dispersion element 116 may spatially separate the pumping illumination 110a of a first wavelength (e.g., IR) incident on the dispersion element 116 from the plasma-generated radiation 112b (e.g., VUV light) exiting the dispersion element 116.

In one embodiment, the dispersion element is formed from a selected material (e.g., $CaF_2$ or $MgF_2$) and arranged relative to the pump source 104 and the generated plasma 108 in order to separate the incident pump illumination 110a and the emitted plasma illumination 112b by deflecting the plasma illumination 112a from an initial direction via refraction, so that the exiting plasma illumination 112b travels along a direction different than the initial direction, as shown in FIG. 1D.

It is noted herein that the dispersion element 116 may be formed from any material known in the art transparent to the pumping illumination and the illumination from the plasma 108, such as, but not limited to, $CaF_2$, $MgF_2$, crystalline quartz, sapphire and the like. It is noted, however, that the construction of the dispersion element 116 is not limited to the materials listed previously herein and such materials have been provided merely for illustrative purposes. It is further recognized herein that the choice of material used to construct the dispersion element 116 may depend on the required level of refractive index variation between the pumping illumination (e.g., IR light) and the plasma-generated illumination (e.g., VUV light) and/or the required level of transmission of the plasma-generated illumination for a given application It is noted herein that when the light 110a from the pump source 104 and the light 112a from the plasma 108 propagates through the prism 116, the beams of light deflect at an angle according to Snell's law. In the case of a $CaF_2$ dispersion element, the deflection angle difference between a first wavelength of 1 µm and a second wavelength of 200 nm is approximately 1.4° or 24 mRad. It is further noted herein that this separation is sufficient for VUV and IR light within a reasonable distance (e.g., 4.2 cm for a beam of 1 mm diameter).

In another embodiment, although not shown, the system 100 includes one or more collimating optics (e.g., collimator) positioned between the pump source 104 and the dispersion element 116 and/or between the plasma 108 and the dispersion element 116. In this regard, pumping illumination 110a and/or plasma illumination 112a may be collimated prior to impinging on the dispersion element 116.

It is recognized herein that the dispersion element 116 may cause the deflected beam 112b to disperse, as shown in FIG. 1D. In another embodiment, the system 100 includes one or recombination optics positioned between the plasma 108 and the dispersion element 116 suitable for recombining the dispersed plasma light 112a into one or more consolidated beams. For example, the recombination optics may include, but are not limited to, a homogenizer suitable for recombining the dispersed plasma light 112a into one or more consolidated beams.

In another embodiment, although not shown, the system 100 may include an additional dispersion element suitable for compensating for the dispersion of the plasma-generated light 112b caused by the dispersion element 116, as shown in FIG. 1D.

In another embodiment, although not shown, the dispersion element 116 may include an IR coating or an AR coating disposed on one or more of the surfaces of the dispersion element 116 in order to reduce reflectivity of the one or more surfaces of the dispersion element 116.

In another embodiment, the dispersion element 116 may include a plurality of prism structures similar to those depicted in FIG. 1C described previously herein. It is again noted herein that such a structure may be utilized in order to reduce bulk absorption of the plasma-generated light 112b (e.g., VUV light) in the dispersion element 116.

Figure 1E:
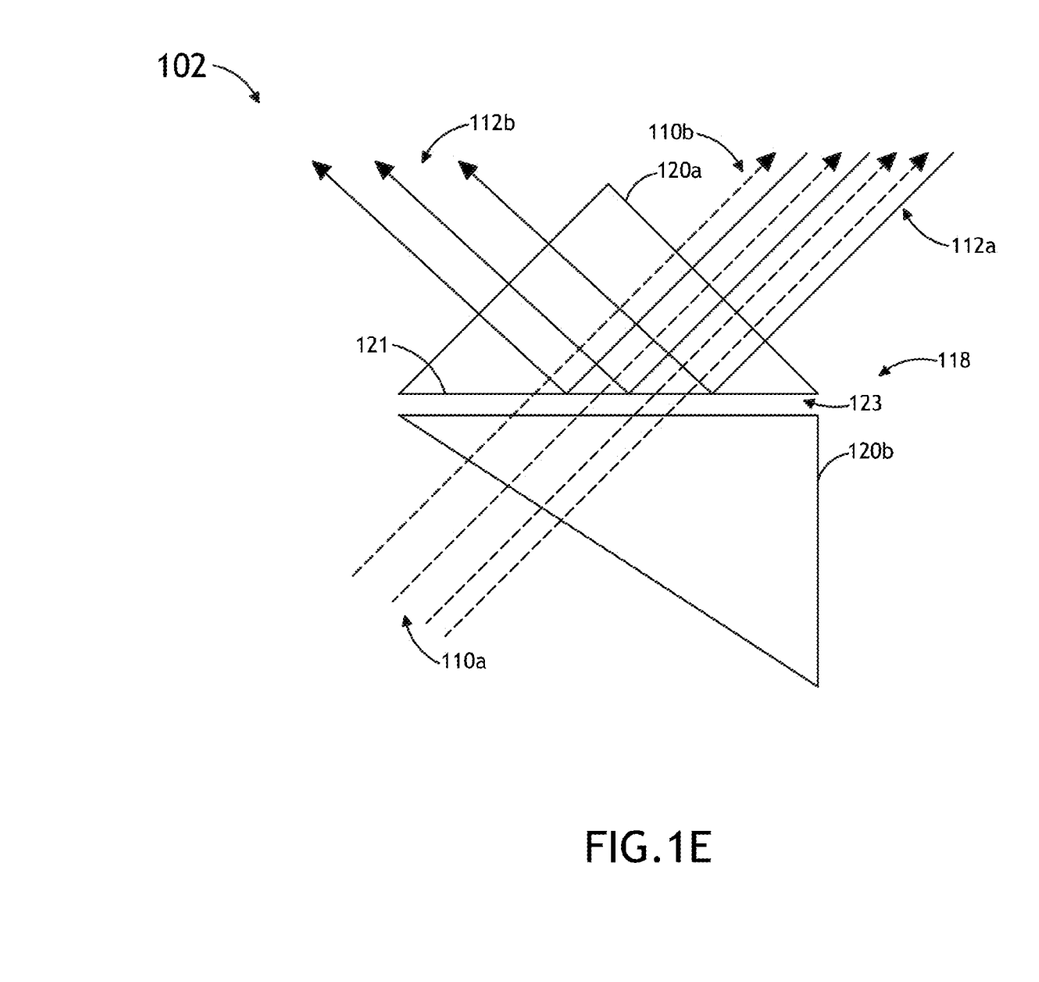
FIG. 1E illustrates a conceptual view of an evanescent field coupling element, in accordance with the present invention.

Referring to FIG. 1E, the one or more separation prism elements 102 include an evanescent field coupling element 118. In one embodiment, the evanescent field coupling element 118 is positioned between a reflective surface of the collector 106 and the pump source 104. In another embodiment, the evanescent field coupling element 118 is arranged so as to spatially separate the incident pumping illumination 110a including the first wavelength and the broadband radiation 112b including at least a second wavelength emitted from the plasma. For example, as shown in FIG. 1E, the evanescent field coupling element 118 may spatially separate the pumping illumination 110a of a first wavelength (e.g., IR) incident on the evanescent field coupling element 118 from the plasma-generated radiation 112b (e.g., VUV light) exiting the evanescent field coupling element 118.

In one embodiment, the evanescent field coupling element 118 includes a first prism sub-element 120a and a second prism sub-element 120b. For example, the first prism sub-element 120a and the second prism sub-element 120b may each include, but are not limited to, a prism. In one embodiment, the second prism sub-element 120b is positioned proximate to the first prism sub-element 120a, thereby forming a gap between the first prism sub-element 120a and the second prism sub-element 120 of a selected distance (e.g., 100 nm to 500 nm). In another embodiment, the first prism sub-element 120a and the second prism sub-element 120b are arranged to transmit a portion of the pumping illumination 110b including the first wavelength (e.g., IR light) and reflect at least a portion of the broadband radiation 112b including at least the second wavelength (e.g., VUV light) emitted by the plasma 108. As shown in FIG. 1E, the transmission of the incident pumping light 110a and the reflection of the incident plasma-generated light 112a causes the resultant beams 110b and 112b to be spatially separated. It is noted herein that the first prism sub-element 120a and the second prism sub-element 120b may be formed from any material known in the art transparent to the pumping illumination and the illumination from the plasma 108, such as, but not limited to, $CaF_2$, $MgF_2$, crystalline quartz, sapphire and the like It is noted herein that the evanescent field coupling element 118 takes advantage of the dependence of evanescent field coupling efficiency on wavelength. For example, the evanescent field coupling element 118 operates based on the difference in evanescent field coupling efficiency between the pumping illumination (e.g., IR light) from the pump source 104 and the plasma-generated light (e.g., VUV light) from the plasma 108. It is noted herein that in the event a total internal reflection takes place, the associated light propagates into the media having a lower index of refraction. The field along the boundary is known as evanescent field. The evanescent field intensity drops exponentially with distance from the TIR surface 121 as illustrated below:

$$I(z) = I_0 e^{-\frac{\lambda}{z}}$$

Where I is the intensity as a function of distance z from the TIR surface 121, $I_0$ is the initial intensity at the TIR surface 121 and $\lambda$ is the wavelength of light.

It is further noted that in the event a second prism 120b is placed within evanescent field 123, the beam in question (e.g., pump illumination or plasma-generated illumination) is partially transmitted. It is recognized herein that the transmitted-to-reflected beam intensity ratio is defined by evanescent field intensity in the second prism 120b and drops exponentially with distance.

For example, in the case of the first sub-element 120a and the second sub-element 120b consisting of $CaF_2$ prisms, placed 200 nm apart, plasma-generated light 112a having a wavelength of 190 nm (i.e., VUV light) experiences 65% reflectivity, while light from the pump source 104 having a 1 µm wavelength experiences approximately a 98% transmissivity. By way of another example, increasing the separation between the first sub-element 120a and the second sub-element 120b increases the reflectivity of the 190 nm light to over 80%, while the transmissivity of the 1 µm light drops to approximately 76%. In this regard, the amount of transmissivity and reflectivity of the pump illumination 110a and the plasma-generated illumination 112a may be controlled by controlling the size of the gap between the first sub-element 120a and the second sub-element 120b.

It is noted herein that the construction of the sub-elements 120a, 120b of the evanescent coupling element 118 is not limited to the materials listed previously herein and such materials have been provided merely for illustrative purposes. It is further recognized herein that the choice of material used to construct the evanescent field coupling element 118 may depend on the required level of refractive index variation between the pumping illumination (e.g., IR light) and the plasma-generated illumination (e.g., VUV light) and/or the required level of transmission of the plasma-generated illumination for a given application.

In another embodiment, although not shown, one or both of the sub-elements 120a, 120b of the evanescent field coupling element 118 may include an IR coating or an AR coating disposed on one or more of the surfaces of the sub-elements 120*a*, 120*b* in order to reduce reflectivity of the one or more surfaces of one or both of the sub-elements 120*a*, 120*b*.

In another embodiment, the evanescent field coupling element 118 includes a material coating disposed between the first sub-element 120*a* and the second sub-element 120*b*. For example, the material coating (not shown) may be disposed on a surface of the first sub-element 120*a* and/or the second sub-element 120*b* at the interface between the first sub-element 120*a* and the second sub-element 120*b*. In this regard, the material coating may replace the air gap depicted in FIG. 1E. In one embodiment, the material coating may include, but is not limited to, a material coating having a low index of refraction (relative to the index of refraction of the sub-elements 120*a*, 120*b*). For example, in the case where the first sub-element 120*a* and the second sub-element 120*b* are formed from $CaF_2$, the material coating may include, but is not limited to, a coating of $MgF_2$.

While the evanescent field coupling element 118 has been described in the context of a first prism sub-element 120*a* and a second prism sub-element 120*b*, it is noted that the sub-elements 120*a* and/120*b* are not limited to prisms. For example, the second sub-element 120*b* may include, but is not limited to, a plate structure (e.g., plate) coated with at least one of an IR coating or an AR coating in order to enhance reflection of the plasma-generated light 112*b* (e.g., VUV light) at the interface 121.

Further, a material coating may be used in place of both the gap 123 and the second sub-element 120*b*. For example, the material coating may include at least a top layer of material having a low index of refraction (relative to the first sub-element 120*a*) for the plasma-generated light 112*b* (e.g., VUV light), while also being at least partially transparent to light from the pump source 104 (e.g., IR light). In this regard, the material coating may include a multi-layer coating, whereby the top layer in contact with the first sub-element 120*a* has a lower refractive index and, thus, enhances TIR for the incident plasma-generated light 112*b*. Further, the bottom portion of the multi-layer coating may be highly transparent to light from the pump source 104. [maybe include figure for this]

It is further noted herein that any of separation elements described previously herein, such as the TIR element 114, the dispersion element 116 and the evanescent field coupling element 118, may be used in combination with one another.

It is recognized herein that the gas containment element 101 may include a number of gas-containing structures suitable for initiating and/or maintaining a plasma 104. In one embodiment, the gas containment element 101 may include, but is not limited to, a plasma bulb suitable for initiating and/or maintaining a plasma 104. In another embodiment, the gas containment element 101 may include, but is not limited to, a plasma cell. In one embodiment, the plasma cell may include, but is not limited to, a transmission element in combination with one or more flanges for containing a gas suitable for initiating and/or maintaining a plasma 104. In another embodiment, the gas containment element 101 may include a large gas chamber. The use of a flanged plasma cell is described in at least U.S. patent application Ser. No. 14/231,196, filed on Mar. 31, 2014; and U.S. patent application Ser. No. 14/288,092, filed on May 27, 2014, which are each incorporated previously herein by reference in the entirety. The use of a plasma bulb is described in at least in U.S. patent application Ser. No. 11/695,348, filed on Apr. 2, 2007; U.S. patent application Ser. No. 11/395,523, filed on Mar. 31, 2006; and U.S. patent application Ser. No. 13/647,680, filed on Oct. 9, 2012, which are each incorporated previously herein by reference in the entirety. The use of a gas chamber as a gas containment element is described in U.S. patent application Ser. No. 12/787,827, filed May 26, 2010, which is incorporated herein by reference in the entirety.

In some embodiments, the transmitting portion of the gas containment element 101 (e.g., transmission element, bulb or window) may be formed from any material known in the art that is at least partially transparent to radiation generated by plasma 108 and/or the pump light 110*a*. In one embodiment, the transmitting portion of the gas containment element 101 (e.g., transmission element, bulb or window) may be formed from any material known in the art that is at least partially transparent to VUV radiation, DUV radiation, UV radiation and/or visible light generated within the gas containment element 101. In another embodiment, the transmitting portion of the gas containment element 101 may be formed from any material known in the art that is at least partially transparent to IR radiation, visible light and/or UV light from the pump source 104. In another embodiment, the transmitting portion of the gas containment element 101 may be formed from any material known in the art transparent to both radiation from the pump source 104 (e.g., IR source) and radiation (e.g., VUV radiation, DUV radiation, UV radiation and/or visible radiation) emitted by the plasma 108.

In some embodiments, the transmitting portion of the gas containment element 101 may be formed from a low-OH content fused silica glass material. In other embodiments, the transmitting portion of the gas containment element 101 may be formed from high-OH content fused silica glass material. For example, the transmission element or bulb of the gas containment element 101 may include, but is not limited to, SUPRASIL 1, SUPRASIL 2, SUPRASIL 300, SUPRASIL 310, HERALUX PLUS, HERALUX-VUV, and the like. In other embodiments, the transmission element or bulb of the gas containment element 101 may include, but is not limited to, $CaF_2$, $MgF_2$, crystalline quartz and sapphire. It is again noted herein that materials such as, but not limited to, $CaF_2$, $MgF_2$, crystalline quartz and sapphire provide transparency to short-wavelength radiation (e.g., $\lambda < 190$ nm). Various glasses suitable for implementation in the gas containment element 101 of the present invention are discussed in detail in A. Schreiber et al., *Radiation Resistance of Quartz Glass for VUV Discharge Lamps*, J. Phys. D: Appl. Phys. 38 (2005), 3242-3250, which is incorporated herein by reference in the entirety.

The transmitting portion of the gas containment element 101 may take on any shape known in the art. For example, the transmission element or bulb may include, but is not limited to, a cylindrical shape, a spherical or ellipsoidal shape. In another embodiment, the transmission element or bulb may include, but is not limited to, a composite shape. For instance, the shape of the transmitting portion of the gas containment element 10 may consist of a combination of two or more shapes. For instance, the shape of the transmitting portion of the gas containment element 101 may consist of a spherical or ellipsoidal center portion, arranged to contain the plasma 108, and one or more cylindrical portions extending above and/or below the spherical or ellipsoidal center portion, whereby the one or more cylindrical portions. In the case where the gas containment element 101 includes plasma cell including a transmission element, the transmission element may be cylindrically shaped, with one or more openings of the transmission element located at the end portions of the cylindrically shaped transmission element. In this regard, the transmission element of the plasma cell may takes the form of a hollow cylinder, whereby a channel extends from the first opening (top opening) to the second opening (bottom opening). In another embodiment, the plasma cell may include a first flange and a second flange, which together with the wall(s) of the transmission element serve to contain the volume of gas within the channel of the transmission element. It is recognized herein that this arrangement may be extended to a variety of transmission element shapes, as described previously herein.

In settings where the gas containment element 101 includes a plasma bulb, the plasma bulb may also take on any shape known in the art. In one embodiment, the plasma bulb may have a cylindrical shape, a spherical or an ellipsoidal shape. In another embodiment, the plasma bulb may have a composite shape. For example, the shape of the plasma bulb may consist of a combination of two or more shapes. For instance, the shape of the plasma bulb may consist of a spherical or ellipsoidal center portion, arranged to contain the plasma 108, and one or more cylindrical portions extending above and/or below the spherical or ellipsoidal center portion.

In one embodiment, the gas containment element 101 may contain any selected gas (e.g., argon, xenon, mercury or the like) known in the art suitable for generating a plasma upon absorption of suitable illumination. In one embodiment, focusing illumination 110a from the pump source 104 into the volume of gas causes energy to be absorbed by the gas or plasma (e.g., through one or more selected absorption lines) within the gas containment element 101, thereby "pumping" the gas species in order to generate and/or sustain a plasma. In another embodiment, although not shown, the gas containment element 101 may include a set of electrodes for initiating the plasma 108 within the internal volume of the gas containment element 101, whereby the illumination from the pump source 104 maintains the plasma 108 after ignition by the electrodes.

It is contemplated herein that the system 100 may be utilized to initiate and/or sustain a plasma 108 in a variety of gas environments. In one embodiment, the gas used to initiate and/or maintain plasma 108 may include an inert gas (e.g., noble gas or non-noble gas) or a non-inert gas (e.g., mercury). In another embodiment, the gas used to initiate and/or maintain a plasma 108 may include a mixture of gases (e.g., mixture of inert gases, mixture of inert gas with non-inert gas or a mixture of non-inert gases). For example, it is anticipated herein that the volume of gas used to generate a plasma 108 may include argon. For instance, the gas may include a substantially pure argon gas held at pressure in excess of 5 atm (e.g., 20-50 atm). In another instance, the gas may include a substantially pure krypton gas held at pressure in excess of 5 atm (e.g., 20-50 atm). In another instance, the gas may include a mixture of argon gas with an additional gas.

It is further noted that the present invention may be extended to a number of gases. For example, gases suitable for implementation in the present invention may include, but are not limited to, Xe, Ar, Ne, Kr, He, $N_2$, $H_2O$, $O_2$, $H_2$, $D_2$, $F_2$, $CH_4$, one or more metal halides, a halogen, Hg, Cd, Zn, Sn, Ga, Fe, Li, Na, Ar:Xe, ArHg, KrHg, XeHg, and the like. In a general sense, the present invention should be interpreted to extend to any light pumped plasma generating system and should further be interpreted to extend to any type of gas suitable for sustaining a plasma within a gas containment element 101.

The collector 106 may take on any physical configuration known in the art suitable for focusing illumination emanating from the pump source 104 into the volume of gas contained within the gas containment element 101. In one embodiment, as shown in FIG. 1, the collector 106 may include a concave region with a reflective internal surface suitable for receiving illumination 110b from the pump source 104 and focusing the illumination 110b into the volume of gas contained within the gas containment element 101. For example, the collector 106 may include an ellipsoid-shaped collector 106 having a reflective internal surface, as shown in FIG. 1.

In one embodiment, system 100 may include various additional optical elements. In one embodiment, the set of additional optics may include collection optics configured to collect broadband light emanating from the plasma 108. For instance, the system 100 may include one or more additional optical elements arranged to direct illumination from the collector 106 to downstream optics, such as, but not limited to, a homogenizer and/or a collecting aperture 114.

In another embodiment, the set of optics may include one or more lenses placed along either the illumination pathway or the collection pathway of system 100. The one or more lenses may be utilized to focus illumination from the pump source 104 into the volume of gas within the gas containment element 101. Alternatively, the one or more additional lenses may be utilized to focus broadband light emanating from the plasma 108 onto a selected target (not shown).

In another embodiment, the set of optics may include one or more filters placed along either the illumination pathway or the collection pathway in order to filter illumination prior to light entering the gas containment element 101 or to filter illumination following emission of the light from the plasma 108. It is noted herein that the set of optics of system 100 as described above and illustrated in FIG. 1A are provided merely for illustration and should not be interpreted as limiting. It is anticipated that a number of equivalent or additional optical configurations may be utilized within the scope of the present invention.

In another embodiment, the pump source 104 of system 100 may include one or more lasers. In a general sense, pump source 104 may include any laser system known in the art. For instance, the pump source 104 may include any laser system known in the art capable of emitting radiation in the infrared, visible or ultraviolet portions of the electromagnetic spectrum. In one embodiment, the pump source 104 may include a laser system configured to emit continuous wave (CW) laser radiation. For example, the pump source 104 may include one or more CW infrared laser sources. For example, in settings where the gas within the gas containment element 101 is or includes argon, the pump source 104 may include a CW laser (e.g., fiber laser or disc Yb laser) configured to emit radiation at 1069 nm. It is noted that this wavelength fits to a 1068 nm absorption line in argon and as such is particularly useful for pumping argon gas. It is noted herein that the above description of a CW laser is not limiting and any laser known in the art may be implemented in the context of the present invention.

In another embodiment, the pump source 104 may include one or more diode lasers. For example, the pump source 104 may include one or more diode lasers emitting radiation at a wavelength corresponding with any one or more absorption lines of the species of the gas contained within the gas containment element 101. In a general sense, a diode laser of pump source 104 may be selected for implementation such that the wavelength of the diode laser is tuned to any absorption line of any plasma (e.g., ionic transition line) or any absorption line of the plasma-producing gas (e.g., highly excited neutral transition line) known in the art. As such, the choice of a given diode laser (or set of diode lasers) will depend on the type of gas contained within the gas containment element 101 of system 100.

In another embodiment, the pump source 104 may include an ion laser. For example, the pump source 104 may include any noble gas ion laser known in the art. For instance, in the case of an argon-based plasma, the pump source 104 used to pump argon ions may include an Ar+ laser.

In another embodiment, the pump source 104 may include one or more frequency converted laser systems. For example, the pump source 104 may include a Nd:YAG or Nd:YLF laser having a power level exceeding 100 watts. In another embodiment, the pump source 104 may include a broadband laser. In another embodiment, the pump source 104 may include a laser system configured to emit modulated laser radiation or pulsed laser radiation.

In another embodiment, the pump source 104 may include one or more lasers configured to provide laser light at substantially a constant power to the plasma 108. In another embodiment, the pump source 104 may include one or more modulated lasers configured to provide modulated laser light to the plasma 108. In another embodiment, the pump source 104 may include one or more pulsed lasers configured to provide pulsed laser light to the plasma.

In another embodiment, the pump source 104 may include one or more non-laser sources. In a general sense, the pump source 104 may include any non-laser light source known in the art. For instance, the pump source 104 may include any non-laser system known in the art capable of emitting radiation discretely or continuously in the infrared, visible or ultraviolet portions of the electromagnetic spectrum.

In another embodiment, the pump source 104 may include two or more light sources. In one embodiment, the pump source 104 may include one or more lasers. For example, the pump source 104 (or "sources") may include multiple diode lasers. By way of another example, the pump source 104 may include multiple CW lasers. In another embodiment, each of the two or more lasers may emit laser radiation tuned to a different absorption line of the gas or plasma within the gas containment element 101 of system 100.

Figure 2:
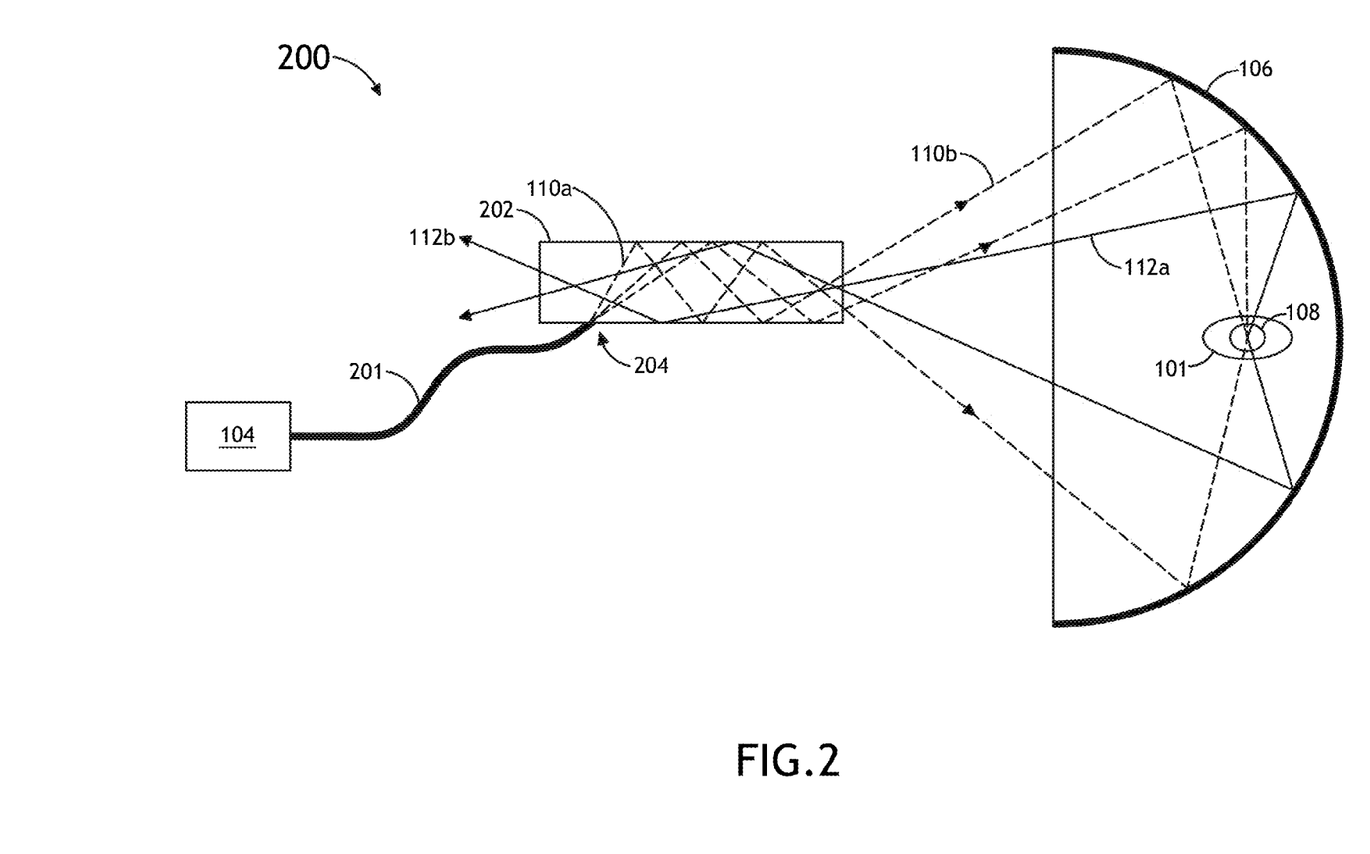
FIG. 2 illustrates a conceptual view of a system for separating pump light and collected light in a laser pumped light source, in accordance with the present invention.

FIG. 2 illustrates a system 200 for separating pump light and collected light in a laser pumped light source, in accordance with an alternative embodiment of the present invention. In one embodiment, the system 200 includes a pump source 104 configured to generate pumping illumination 110a including at least a first wavelength. In another embodiment, the system 200 includes gas containment element 101 for containing a volume of gas. For example, the gas containment element 101 may include, but is not limited to, a plasma cell, a plasma bulb, or a gas chamber with transparent windows (not shown in FIG. 2), as described previously herein. In another embodiment, the system 200 includes collector 106 configured to focus the pumping illumination 110b from the pumping source 104 into the volume of gas to generate a plasma 108 within the volume of gas. In another embodiment, the plasma 108 emits broadband radiation 112a including at least a second wavelength. In another embodiment, the system 200 includes a homogenizing element 202. In another embodiment, the system 200 includes an optical fiber 201 for optically coupling the pump source 104 and the homogenizing element 202. In another embodiment, the optical fiber 201 is configured to deliver pumping illumination 110a to the homogenizing element 202 at an off-axis location 204 of the homogenizing element 202.

It is noted herein that various components and embodiments described previously herein with respect to FIGS. 1A-1E should be interpreted to extend to FIG. 2 unless otherwise noted and are not repeated herein for purposes of clarity.

In one embodiment, the homogenizing element 202 is transparent to the plasma-generated broadband radiation 112a from the plasma 108 and the pumping illumination 110a from the pump source 104. It is noted herein that the homogenizing element 202 may play a dual role as it serves to shape the incident pump beam 110a and also serves to homogenize collected plasma-generated light 112a. The coupling of the homogenized light into the fiber is low. It is further noted herein that due to the off-axis coupling of the fiber 201 with the homogenizing element 202 the coupling of plasma-generated light 112b into the fiber 201 is diminished since most of the plasma-generated light 112b (e.g., UV, DUV and VUV light) from the collector 106 is transmitted through the homogenizing element 202. Further, the coupling of plasma-generated light 112b into the fiber 201 is diminished due to the large etendue difference associated with light traveling through the homogenizing element 202 and light traveling through the fiber 201.

In one embodiment, the homogenizing element 202 includes one or more homogenizers. In another embodiment, the homogenizing element 202 includes one or more waveguides. For example, the homogenizing element 202 may include a homogenizer or a waveguide formed from a VUV-transparent material, such as, but not limited to, $CaF_2$, $MgF_2$, crystalline quartz, sapphire and the like. It is noted herein that the homogenizing element is not limited to these materials, which are provided merely for illustrative purposes. Further, the homogenizing element 202 may be selected such that it is transparent to wavelength regimes other than VUV-light. The homogenizing element 202 may be transparent to any wavelength of useful light collected from a plasma. For example, the homogenizing element 202 may be formed from a material transparent to at least one of VUV-light, DUV-light, UV-light and visible light.

The homogenizing element 202 may take on any cross-sectional shape known in the art. In one embodiment, the homogenizing element 202 may have an elongated shape having a selected cross-sectional shape. For example, the cross-section shape of the homogenizing element 202 may include, but is not limited to, a rectangle, a circle, a square, a hexagon, an octagon and the like.

In another embodiment, the homogenizing element 202 may include a solid homogenizing element. For example, the homogenizing element 202 may include a solid cylinder, a solid rectangular prism, a solid hexagonal prism, a solid octagonal prism and the like. In another embodiment, the homogenizing element 202 may include a hollow homogenizing element. For example, the homogenizing element 202 may include a hollow cylinder, a hollow rectangular prism, a hollow hexagonal prism, a hollow octagonal prism and the like.

In another embodiment, although not shown, the system 200 may include an additional pump source configured to generate additional pumping illumination including at least one of the first wavelength and an additional wavelength different from the first wavelength. For example, the additional pump source may provide additional laser light of the same or a different wavelength than the first pump source 104. In another embodiment, although not shown, the system 200 may include an additional optical fiber optically coupling the additional pump source and the homogenizing element 202. In this regard, the additional optical fiber may deliver the additional pumping illumination (e.g., same wavelength as first wavelength or different than first wavelength) to the homogenizing element at an additional off-axis location of the homogenizing element 202. Such an arrangement allows for multiple fibers (e.g., 201) to couple multiple pump sources (e.g., 104) to the same homogenizing element 202. As such, pump light from separate lasers may be coupled to the homogenizing element 202. In one embodiment, the multiple pump lasers may generate different wavelengths of light, allowing the system 200 to efficiently pump the plasma with a variety pumping wavelengths. It is noted herein that any output parameter (e.g., intensity, pulse frequency, polarization and the like) may be varied across each of the beams of the multiple pump lasers and such variation is not limited to the wavelength associated with each pump source.

In another embodiment, one or more portions of the homogenizing element 202 are coated with one or more material coatings. For example, one or both of the entrances of the homogenizing element 202 may be coated with an IR coating or an AR coating in order to reduce reflection losses associated with the pump illumination 110a (e.g., IR light) or the plasma-generated illumination 112a (e.g., VUV light).

It is recognized herein that system 200 and the associated embodiments provide for the preservation of a high NA for both pumping illumination 110a, 110b and collection illumination 112a, 112b. In addition, system 200 produces a homogenized output illumination associated with the plasma-generated light (e.g., VUV light).

Figure 3:
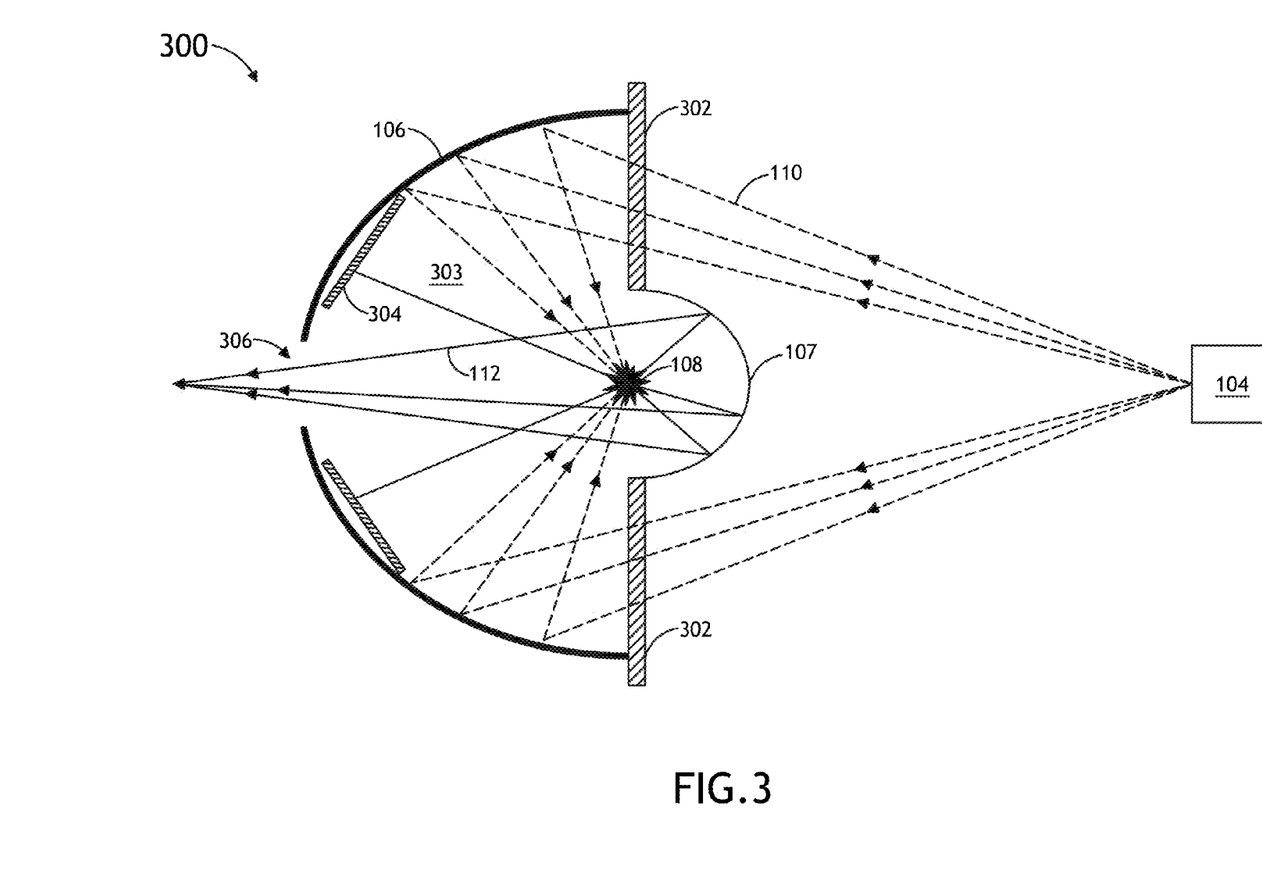
FIG. 3 illustrates a conceptual view of a system for separating pump light and collected light in a laser pumped light source, in accordance with the present invention.

FIG. 3 illustrates a system 300 for separating pump light and collected light in a laser pumped light source, in accordance with an alternative embodiment of the present invention. It is noted herein that various components and embodiments described previously herein with respect to FIGS. 1A-1E and FIG. 2 should be interpreted to extend to FIG. 3 unless otherwise noted and are not repeated herein for purposes of clarity.

In one embodiment, the system 300 includes the pump source 104 configured to generate pumping illumination including at least a first wavelength.

In another embodiment, the system 300 includes a first collector 106. In one embodiment, the first collector 106 is configured to collect and focus the pumping illumination 110 (e.g., IR light) from the pumping source 104 into the volume of gas to generate a plasma 108 within the volume of gas. Further, the reflective surface of the first collector 106 may be selected such that it is highly reflective to the pumping illumination 110 from the pumping source 104. In another embodiment, the system 300 includes a second collector 107. In one embodiment, the second collector 107 is configured to collect and focus broadband radiation 112 emitted by the plasma 108. In this regard, the reflective surface of the first collector 106 may be selected such that it is highly reflective to one or more selected portions (e.g., VUV light, DUV light, UV light and/or visible) of the emitted broadband light 112. In another embodiment, the first collector 106 and/or the second collector 107 may include, but are not limited to, an ellipsoidal mirror.

In another embodiment, the first collector 106 and the second collector 107 are arranged opposite to one another, with their reflective surfaces substantially facing one another. It is noted herein that only a limited NA is utilized, as shown in FIG. 3. It is noted that the first collector 106 (used to collect pumping illumination 110) is relatively large compared to the overall angular distribution of illumination, with less than $2\pi$ solid angle being used for plasma pumping.

In another embodiment, as shown in FIG. 3, the system 300 includes one or more windows transparent to the at least the first wavelength of light (e.g., IR light) from the pump source 104. In another embodiment, the one or more windows are positioned between the pump source 104 and a concave collecting portion of the first collector 106, as shown in FIG. 3. In another embodiment, the first collector 106, the second collector 107 and the one or more mirrors 302 form a gas containment chamber 303 suitable for containing the gas needed to maintain the plasma 108. It is noted herein that the gas containment chamber 303 may be pressured with any gas suitable for maintaining a plasma, as described previously herein.

In another embodiment, the first collector 106 includes an opening 306 sized and positioned so as to allow collected broadband radiation 112 from the plasma 108 pass through to downstream optical elements. In one embodiment, the opening 306 may include a window transparent to at least a portion of the broadband radiation (e.g., VUV, DUV or UV). Such a configured, along with the transparent windows 302, allows for the sealing and pressurizing of the chamber 303. It is noted herein that the total collection angle may also be approximately $2\pi$ solid angle.

In another embodiment, the system 300 includes one or more spherical mirrors 304 disposed on an interior wall of the first collector 106. For example, the one or more spherical mirrors 304 may include a first spherical mirror disposed on a first side of opening 306 and a second spherical mirror disposed on a second side of the opening 306 opposite the first side, as shown in FIG. 3. In one embodiment, the one or more spherical mirrors are configured to reflect at least a portion of out-of-band light (i.e., light outside the band of plasma output), such as IR or visible light, into the plasma 108. It is noted herein that by directing out-of-band light back into the plasma 108 the plasma pumping efficiency may be improved. In another embodiment, the one or more spherical mirrors 304 are configured to reflect at least a portion of in-band light (i.e., light inside the band of plasma output), such as VUV, DUV or UV light, onto the second collector 107. It is further noted herein that the in-band light reflected from the spherical mirrors 304 is picked up by the second collector 107 and directed out of the opening 306.

In another embodiment, the first collector 106 and the second collector 107 may have different relative orientations.

In another embodiment, the system 300 may include a segmented collector (e.g., ellipse) rather than two separate collectors 106, 107. In this regard, each segment of the segmented ellipse may independently collect and reflect UV and IR light. In one embodiment, each segment of the segment ellipse may include, but is not required to include, a different coating, which enables the segment reflective response to UV and IR light. In another embodiment, each segment may have a separate foci that may be used to separate IR and UV light.

In another embodiment, a common collector may be used for both pumping illumination 110 (e.g., IR light) and collected broadband illumination 112 (e.g., VUV light). For example, a non-transparent mirror may be used to separate the pumping illumination 110 and the collected illumination 112.

In another embodiment, the first collector 106 and/or the second collector 107 may be constructed with multiple angular zones for pumping and/or collection illumination. For example, the second collector 107 used for collecting broadband radiation (e.g., VUV light) may include multiple angular zones (e.g., checkerboard pattern) corresponding to multiple openings. These multiple openings may each individually be used for pumping the plasma 107.

In another embodiment, the system 300 may be used in conjunction with any gas containment structure known in the art. For example, a plasma cell or a plasma bulb, as described previously herein, may be used to contain the gas and receive pumping illumination from the first collector 106 (e.g., via IR transparent window or bulb wall). Further, the plasma cell or plasma bulb may transmit broadband radiation (e.g., via VUV transparent window or bulb wall). The transmitted broadband radiation may then be collected via collector 107 and directed to opening 306. It is noted herein that in a configuration where the plasma gas is contained locally in a plasma cell or plasma bulb, the windows 302 may not be required.

In another embodiment, any of the refractive elements described previously herein may be used in combination with the system 300 for the purposes of focusing, collecting and/or separating pumping illumination and collected broadband illumination.

It is recognized herein that the architecture depicted in FIG. 3 is particularly advantageous due to the complete separation of optical elements for the pumping illumination and the emitted broadband radiation, allowing for independent optimization of the pumping mirror 106 and the broadband mirror 107. The system of 300 further allows for focusing short wavelength broadband light onto a small spot, which may be beneficial in certain settings. In addition, the system 300 is constructed entirely of reflective components, making it preferable in many short wavelength generation. Further, the utilization of large optical components (e.g., collector 106 and collector 107) aid in improving UV damage resistance.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A system for separating pump light and collected light in a laser pumped light source comprising:
    a pump source configured to generate pumping illumination including at least a first wavelength;
    a gas containment element for containing a volume of gas;
    a collector configured to focus the pumping illumination from the pumping source into the volume of gas to generate a plasma within the volume of gas, wherein the plasma emits broadband radiation including at least a second wavelength; and
    one or more illumination separation prism elements positioned between a reflective surface of the collector and the pump source and arranged to spatially separate the pumping illumination including the first wavelength and the emitted broadband radiation including at least a second wavelength emitted from the plasma, wherein the one or more separation prism elements are positioned such that the pumping illumination including the first wavelength enters the one or more illumination separation prism elements at a first face and broadband radiation including the at least the second wavelength enters the one or more illumination separation prism elements at a second face different from the first face.

2. The system of claim 1, wherein the one or more illumination separation prism elements comprise:
    one or more total internal reflection elements positioned between a reflective surface of the collector and the pump source and arranged to spatially separate the pumping illumination including the first wavelength and the broadband radiation including at least the second wavelength emitted from the plasma.

3. The system of claim 2, wherein the one or more total internal reflection elements is formed from a selected material and arranged relative to the pump source and the generated plasma in order to establish total internal reflection to the plasma illumination and transparency to the pump illumination.

4. The system of claim 3, wherein the plasma illumination undergoes total internal reflection at a first surface within the one or more total internal reflection elements and exits the one or more total internal reflection elements at a second face.

5. The system of claim 2, the one or more total internal reflection elements comprises:
    a plurality of total internal reflection elements.

6. The system of claim 1, wherein the one or more illumination separation prism elements comprise:
    one or more dispersion elements positioned between a reflective surface of the collector and the pump source and arranged to spatially separate the pumping illumination including the first wavelength and the broadband radiation including at least the second wavelength emitted from the plasma.

7. The system of claim 6, wherein the one or more dispersion elements is formed from a material and a selected material and arranged relative to the pump source and the generated plasma in order to separate the pump illumination and plasma illumination by deflecting the plasma illumination from an initial direction via refraction.

8. The system of claim 6, further comprising:
    one or more collimating optics configured to collimate at least one of the pump illumination and the plasma illumination prior to incidence on the one or more dispersion elements.

9. The system of claim 6, further comprising:
one or more recombination optics configured to combine plasma illumination emanating from the one or more dispersion elements.

10. The system of claim 6, further comprising:
one or more additional dispersion elements configured to compensate for dispersion caused by the one or more dispersion elements.

11. The system of claim 6, the one or more dispersion elements comprises:
a plurality of dispersion elements.

12. The system of claim 1, wherein the one or more illumination separation prism elements comprise:
one or more evanescent field coupling elements positioned between a reflective surface of the collector and the pump source and arranged to spatially separate the pumping illumination including the first wavelength and the broadband radiation including at least the second wavelength emitted from the plasma.

13. The system of claim 12, wherein the one or more evanescent field coupling elements comprise:
a first sub-element;
a second sub-element positioned proximate to the first sub-element to form a gap between the first sub-element and the second sub-element having a selected distance, wherein the first sub-element and the second sub-element are arranged to transmit at least a portion of the pumping illumination including the first wavelength and reflect at least a portion of the broadband radiation including at least the second wavelength emitted by the plasma.

14. The system of claim 13, wherein the first sub-elements comprises:
a prism.

15. The system of claim 14, wherein the second sub-elements comprises:
at least one of a prism and a plate coated with at least one of an infrared coating or an anti-reflective coating.

16. The system of claim 13, wherein the gap between first sub-element and the second sub-element contains a coating having a low refractive index.

17. The system of claim 1, wherein one or more surface of the one or more illumination separation prism elements is coated with at least one of an infrared coating and an anti-reflective coating in order to reduce reflection of at least one of the pumping illumination and the broadband illumination at the one or more surfaces.

18. The system of claim 1, wherein the one or more illumination separation prism elements are formed from at least one of calcium fluoride, magnesium fluoride, crystalline quartz and sapphire.

19. The system of claim 1, wherein the broadband radiation emitted by the plasma includes at least one of vacuum ultraviolet radiation, deep ultraviolet radiation, ultraviolet radiation and visible radiation.

20. The system of claim 1, wherein the gas containment element comprises:
a plasma bulb for containing the gas.

21. The system of claim 1, wherein the gas containment element comprises:
a plasma cell for containing the gas.

22. The system of claim 21, wherein the plasma cell comprises:
a transmission element; and
one or more flanges disposed at one or more ends of the transmission element for containing the gas.

23. The system of claim 1, wherein a transmitting portion of the gas containment element is formed from at least one of calcium fluoride, magnesium fluoride, crystalline quartz, sapphire and fused silica.

24. The system of claim 1, wherein a transmitting portion of the gas containment element is at least partially transparent to at least one of vacuum ultraviolet radiation, deep ultraviolet radiation, ultraviolet radiation and visible radiation emitted by the plasma.

25. The system of claim 1, wherein the collector comprises:
an ellipsoid-shaped collector.

26. The system of claim 1, wherein the illumination source comprises:
one or more lasers.

27. The system of claim 26, wherein the one or more lasers comprise:
at least one of one or more infrared lasers, one or more visible lasers and one or more ultraviolet lasers.

28. The system of claim 26, wherein the one or more lasers comprise:
at least one of a diode laser, a continuous wave laser, or a broadband laser.

29. The system of claim 1, wherein the gas comprises:
at least one of an inert gas, a non-inert gas and a mixture of two or more gases.

30. A system for separating pump light and collected light in a laser pumped light source comprising:
a pump source configured to generate pumping illumination including at least a first wavelength;
a gas containment element for containing a volume of gas;
a collector configured to focus the pumping illumination from the pumping source into the volume of gas to generate a plasma within the volume of gas, wherein the plasma emits broadband radiation including at least a second wavelength;
a homogenizing element; and
an optical fiber optically coupling the pump source and the homogenizing element, wherein an output of the optical fiber is optically coupled to the homogenizing element at an off-axis location of the homogenizing element so as to deliver pumping illumination to the homogenizing element at the off-axis location of the homogenizing element.

31. The system of claim 30, wherein the homogenizing element comprises:
one or more homogenizers.

32. The system of claim 30, wherein the homogenizing element comprises:
one or more waveguides.

33. The system of claim 30, wherein the homogenizing element is formed from at least one of calcium fluoride, magnesium fluoride, crystalline quartz and sapphire.

34. The system of claim 30, wherein the homogenizing element has a cross-sectional shape of at least one of a rectangle, a circle, a hexagonal and an octagon.

35. The system of claim 30, wherein the homogenizing element comprises:
at least one of a solid homogenizing element and a hollow homogenizing element.

36. The system of claim 30, wherein the homogenizing element comprises:
a homogenizing element including one or more portions coated with at least one of an infrared coating and an anti-reflective coating.

37. The system of claim 30, further comprising:
an additional pump source configured to generate additional pumping illumination including at least one of the first wavelength and an additional wavelength different from the first wavelength; and
an additional optical fiber optically coupling the additional pump source and the homogenizing element, wherein the additional optical fiber is configured to deliver the additional pumping illumination to the homogenizing element at an additional off-axis location of the homogenizing element.

38. The system of claim 30, wherein the broadband radiation emitted by the plasma includes at least one of vacuum ultraviolet radiation, deep ultraviolet radiation, ultraviolet radiation and visible radiation.

39. The system of claim 30, wherein the gas containment element comprises:
a plasma bulb for containing the gas.

40. The system of claim 30, wherein the gas containment element comprises:
a plasma cell for containing the gas.

41. The system of claim 40, wherein the plasma cell comprises:
a transmission element; and
one or more flanges disposed at one or more ends of the transmission element for containing the gas.

42. The system of claim 30, wherein the gas containment element comprises:
a chamber equipped with one or more windows transparent to at least one of the pumping illumination and the emitted broadband radiation.

43. The system of claim 30, wherein a transmitting portion of the gas containment element is formed from at least one of calcium fluoride, magnesium fluoride, crystalline quartz, sapphire and fused silica.

44. The system of claim 30, wherein a transmitting portion of the gas containment element is at least partially transparent to at least one of vacuum ultraviolet radiation, deep ultraviolet radiation, ultraviolet radiation and visible radiation emitted by the plasma.

45. The system of claim 30, wherein the collector comprises:
an ellipsoid-shaped collector.

46. The system of claim 30, wherein the illumination source comprises:
one or more lasers.

47. The system of claim 46, wherein the one or more lasers comprise:
at least one of one or more infrared lasers, one or more visible lasers and one or more ultraviolet lasers.

48. The system of claim 46, wherein the one or more lasers comprise:
at least one of a diode laser, a continuous wave laser, or a broadband laser.

49. The system of claim 30, wherein the gas comprises:
at least one of a noble gas, inert gas, a non-inert gas and a mixture of two or more gases.

* * * * *